United States Patent
Kim et al.

(10) Patent No.: US 9,445,298 B2
(45) Date of Patent: Sep. 13, 2016

(54) METHOD, APPARATUS, AND SYSTEM FOR CONTROLLING TERMINAL DEVICE

(71) Applicant: MARKANY INC., Seoul (KR)

(72) Inventors: Mi Gyung Kim, Gyeonggi-do (KR); Hyoung Jun Kim, Seoul (KR); Kyu Won Lee, Seoul (KR)

(73) Assignee: Markany Inc., Seoul (KR)

( * ) Notice: Subject to any disclaimer, the term of this patent is extended or adjusted under 35 U.S.C. 154(b) by 264 days.

(21) Appl. No.: 13/967,447

(22) Filed: Aug. 15, 2013

(65) Prior Publication Data

US 2014/0108634 A1    Apr. 17, 2014

(30) Foreign Application Priority Data

Oct. 16, 2012  (KR) .......................... 10-2012-0114778

(51) Int. Cl.
   *G06F 15/173*   (2006.01)
   *H04W 28/02*    (2009.01)
   *H04L 29/06*    (2006.01)

(52) U.S. Cl.
   CPC .......... *H04W 28/0226* (2013.01); *H04L 63/20* (2013.01)

(58) Field of Classification Search
   CPC .......................... H04W 28/0226; H04L 63/20
   USPC ......................................................... 709/224
   See application file for complete search history.

(56) References Cited

U.S. PATENT DOCUMENTS

| | | | |
|---|---|---|---|
| 6,725,281 B1* | 4/2004 | Zintel et al. | 719/318 |
| 7,814,215 B2* | 10/2010 | Lee et al. | 709/228 |
| 8,150,959 B1* | 4/2012 | Bezdicek et al. | 709/224 |
| 9,041,561 B2* | 5/2015 | Wallace et al. | 340/992 |
| 2011/0039573 A1* | 2/2011 | Hardie | G01C 21/005 455/456.1 |
| 2011/0087752 A1* | 4/2011 | Takahashi et al. | 709/208 |

* cited by examiner

*Primary Examiner* — Phuoc Nguyen
(74) *Attorney, Agent, or Firm* — Occhiuti & Rohlicek LLP

(57) ABSTRACT

Disclosed are a method, apparatus, and system for controlling a terminal device. A method of controlling a terminal device is performed by a terminal device control unit included in the terminal device. The method may include determining whether or not to change a state of the terminal device into a terminal device control state based on range information including at least one of a control area and a control period in which the terminal device is controlled and the real-time information of the terminal device, changing the state of the terminal device into the terminal device control state based on a result of the determination, and controlling the terminal device based on the control information in the terminal device control state.

29 Claims, 5 Drawing Sheets

METHOD, APPARATUS, AND SYSTEM FOR CONTROLLING TERMINAL DEVICE

Priority to Korean patent application number 10-2012-0114778 filed on 16 Oct., 2012, the entire disclosure of which is incorporated by reference herein, is claimed.

BACKGROUND OF THE INVENTION

1. Field of the Invention

The present invention relates to a method, apparatus, and system for controlling a terminal device and, more particularly, to terminal device control technology in which the functions of a portable terminal device can be controlled within a specific area or for a specific period or both based on device control information.

2. Discussion of the Related Art

Recently, as ultra-high wireless communication infrastructure is constructed and various digital wireless devices have come into wide use, existing tasks performed through a fixed type terminal device, such as a PC, have become executed through a portable terminal device. In particular, a smart terminal, such as a smart pad or a smart phone, is recently being explosively used because it provides excellent portability, that is, the greatest advantage of a portable terminal device, and has almost the same performance as a PC and a much wider screen than a pervious smart terminal.

A portable terminal device is advantageous in that it can provide new and convenient services not provided by an existing fixed type device because a user can use the portable terminal device anytime and anywhere while carrying it. Meanwhile, as a portable terminal device is equipped with various functions almost equivalent to those of a PC, there is a good possibility that intended or unintended information spill through the portable terminal device can occur because various pieces of information can be easily accessed and obtained.

In order to prevent this problem, various solutions for controlling a terminal device are appearing for the management of information spill and efficient assets. One of the solutions is a Mobile Device Management (MDM) solution. The MDM solution functions to prevent the illegal leakage of information and manage assets by managing mobile devices owned by executives and staff members in a company.

For example, in a company, smart phones, tablet PCs, etc. are supplied to executives and staff members for office purposes, and business applications based on a mobile office are installed in the smart phones, tablet PCs, etc. In this case, however, the executives and staff members can leak information important for the company out to the outside using functions, such as the screen capturing, photographing, and printing of the mobile devices, for undesirable purposes, and the important information can leak to the outside through the terminal devices themselves due to unexpected loss or robbery. Accordingly, the MDM solution can prevent the leakage of information through security functions, such as screen capturing control, encryption, and photographing control using a camera.

In conventional terminal device control techniques including the MDM solution, it is substantially difficult to control terminal devices out of a corresponding area because the conventional terminal device control techniques are specified for control of terminal devices for a specific group or organization. Furthermore, the conventional terminal device control techniques cannot be applied to a place where unspecified individuals are crowded, such as an exhibition or a concert hall.

In addition, the conventional terminal control techniques are constructed based on a server. Thus, a terminal device must be registered with a server and must perform an approval process while operating in conjunction with the server when accessing the server. Accordingly, a lot of costs and manpower are necessary for the construction and maintenance and repairs of a server if the server is constructed to manage many terminal devices at a time.

Accordingly, there is an urgent need for the development of terminal device control technology which can be widely used and can significantly reduce costs for constructing a system so that control situations of various terminal devices can be taken into consideration.

PRIOR ART DOCUMENT

Patent Document

Korean Patent Laid-Open Publication No. 2011-0127565

SUMMARY OF THE INVENTION

An object of the present invention is to provide a method, apparatus, and system for controlling a terminal device, which can control the functions of a terminal device within a specific area or for a specific period or both based on device control information distributed in various ways.

An aspect of the present invention provides a method of controlling a terminal device. The method of controlling a terminal device includes receiving, by a terminal device control unit included in the terminal device, device control information including range information, including at least one of a control area and a control period in which the terminal device is controlled, and control information for controlling the terminal device from the first information acquisition unit of the terminal device; receiving, by the terminal device control unit, real-time information including at least one of a real-time position and the present time of the terminal device from the second information acquisition unit of the terminal device; determining, by the terminal device control unit, whether or not to change the state of the terminal device into a terminal device control state based on the range information and the real-time information; changing, by the terminal device control unit, the state of the terminal device into the terminal device control state based on a result of the determination; and controlling, by the terminal device control unit, the terminal device based on the control information in the terminal device control state.

Determining, by the terminal device control unit, whether or not to change the state of the terminal device into a terminal device control state may include determining whether or not the real-time position of the terminal device is within the control area and determining to change the state of the terminal device into the terminal device control state if, as a result of the determination, the real-time position of the terminal device is within the control area.

Determining, by the terminal device control unit, whether or not to change the state of the terminal device into a terminal device control state may include determining whether or not the present time is within the control period and determining to change the state of the terminal device into the terminal device control state if, as a result of the determination, the present time is within the control period.

Determining, by the terminal device control unit, whether or not to change the state of the terminal device into a terminal device control state may include determining whether or not the real-time position is within the control area; determining whether or not the present time is within the control period; and determining to change the state of the terminal device into the terminal device control state if, as a result of the determination, the real-time position is within the control area and the present time is within the control period.

The first information acquisition unit may obtain the device control information and a Uniform Resource Locator (URI) on which the device control information is obtained through at least one of a barcode, a Quick Response (QR) code, Near Field Communication (NFC), Universal Serial Bus (USB) communication, audio watermarking communication, LAN communication, wired data communication, and wireless data communication. When the URI is obtained, the first information acquisition unit may obtain the device control information using the URI.

The method may further include receiving, by the terminal device control unit, real-time information including at least one of a real-time position and the present time of the terminal device from the second information acquisition unit after changing the state of the terminal device into the terminal device control state; determining, by the terminal device control unit, at least one of whether or not the real-time position of the terminal device has deviated from the control area and whether or not the present time of the terminal device has deviated from the control period; and changing, by the terminal device control unit, the state of the terminal device from the terminal device control state to a terminal device control release state based on at least one of the determinations.

Controlling, by the terminal device control unit, the terminal device based on the control information in the terminal device control state may include controlling at least one of the screen capturing function, the photographing function using a camera, the data encryption and decrypting functions, the data transfer function, the data storage function, and the print function using a printer of the terminal device based on the control information. The received device control information may have been encrypted. In this case, the method may further include decrypting the encrypted device control information.

Meanwhile, another aspect of the present invention provides a terminal device controller. The terminal device controller is included in a terminal device. The terminal device controller may include a device control information reception unit for receiving device control information including range information, including at least one of a control area and a control period in which the terminal device is controlled, and control information for controlling the terminal device from the first information acquisition unit of the terminal device; a real-time information reception unit for receiving real-time information including at least one of a real-time position and the present time of the terminal device from the second information acquisition unit of the terminal device; a state management unit for determining whether or not to change the state of the terminal device into a terminal device control state based on the range information and the real-time information and changing the state of the terminal device into the terminal device control state based on a result of the determination; and a control unit for controlling the terminal device based on the control information in the terminal device control state.

The state management unit may determine whether or not the real-time position of the terminal device is within the control area and determine to change the state of the terminal device into the terminal device control state if, as a result of the determination, the real-time position of the terminal device is within the control area. The state management unit may determine whether or not the present time is within the control period and determine to change the state of the terminal device into the terminal device control state if, as a result of the determination, the present time is within the control period.

The state management unit may determine whether or not the real-time position is within the control area, determine whether or not the present time is within the control period, and determine to change the state of the terminal device into the terminal device control state if, as a result of the determination, the real-time position is within the control area and the present time is within the control period.

The first information acquisition unit may obtain the device control information and a Uniform Resource Locator (URI) on which the device control information is obtained through at least one of a barcode, a Quick Response (QR) code, Near Field Communication (NFC), Universal Serial Bus (USB) communication, audio watermarking communication, LAN communication, wired data communication, and wireless data communication. When the URI is obtained, the first information acquisition unit may obtain the device control information using the URI.

The real-time information reception unit may receive real-time information including at least one of a real-time position and the present time of the terminal device from the second information acquisition unit after changing the state of the terminal device into the terminal device control state. The state management unit may determine at least one of whether or not the real-time position of the terminal device has deviated from the control area and whether or not the present time of the terminal device has deviated from the control period and changes the state of the terminal device from the terminal device control state to a terminal device control release state based on at least one of the determinations.

The control unit may control at least one of the screen capturing function, the photographing function using a camera, the data encryption and decrypting functions, the data transfer function, the data storage function, and the print function using a printer of the terminal device based on the control information.

Meanwhile, yet another aspect of the present invention provides a terminal device control system. The terminal device control system may include a server unit configured to generate device control information including range information, including at least one of a control area and a control period in which a terminal device is controlled, and control information for controlling the terminal device and converting the generated device control information into a distributable form; and a terminal device control unit included in the terminal device and configured to change the state of the terminal device into a terminal device control state based on the device control information obtained by the terminal device and real-time information including at least one of a real-time position and the present time of the terminal device and to control at least one function of the terminal device based on the control information in the terminal device control state.

The terminal device controller may control at least one of the screen capturing function, the photographing function using a camera, the data encryption and decrypting functions, the data transfer function, the data storage function, and the print function using a printer of the terminal device based on the control information.

The server unit may convert the generated device control information into one of a barcode, a QR code, audio watermarking communication, and data enabling at least one of NFC, USB communication, LAN communication, wired data communication, and wireless data communication.

DETAILED DESCRIPTION OF THE EMBODIMENTS

Figure 1:
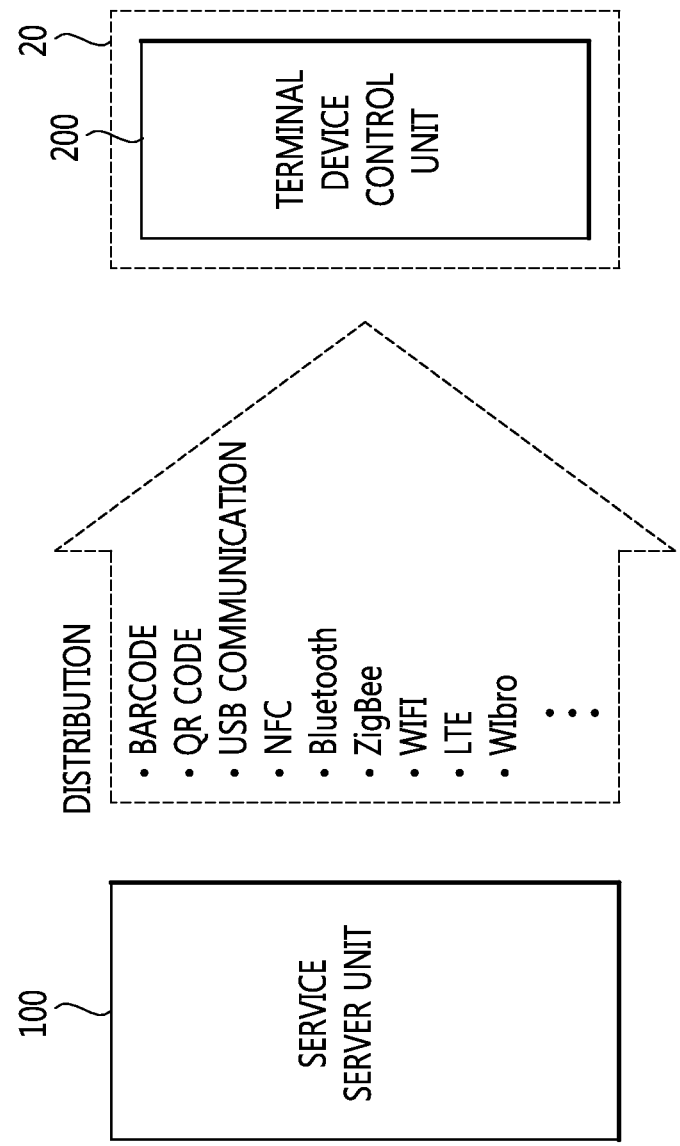
FIG. 1 is a block diagram showing the construction of a system for realizing a method of controlling a terminal device in accordance with an exemplary embodiment of the present invention.

The present invention may be modified in various ways and may be implemented to have several embodiments. Specific embodiments of the present invention are illustrated in the drawings and are described in detail in the detailed description. It is however to be noted that the present invention is not intended to be limited to the specific embodiments, but is intended to include all modifications, equivalents, or substitutions which fall within the spirit and technical scope of the present invention.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may be named a first element. A term, such as and/or, includes a combination of a plurality of pertinent and described items or any one of a plurality of pertinent and described items.

When it is said that one element is 'connected' or 'coupled' with the other element, it should be understood that one element may be directly connected or coupled with the other element, but a third element may exist between the two elements. In contrast, when it is said that one element is 'directly connected' or 'directly coupled' with the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as 'comprise' or 'have', are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

All terms used herein, including technical or scientific terms, have the same meanings as those that are typically understood by those skilled in the art, unless otherwise defined. Terms, such as ones defined in common dictionaries, should be constructed as having the same meanings as those in the context of related technology and should not be constructed as having ideal or excessively formal meanings, unless clearly defined in the specification.

Hereinafter, some exemplary embodiments of the present invention are described in detail with reference to the accompanying drawings. In describing the present invention, in order to help general understanding, the same reference numerals designate the same elements throughout the drawings and a redundant description of the same elements is omitted.

FIG. 1 is a block diagram showing the construction of a system for realizing a method of controlling a terminal device in accordance with an exemplary embodiment of the present invention.

As shown in FIG. 1, a terminal device control system for realizing a method of controlling a terminal device in accordance with an exemplary embodiment of the present invention includes a service server unit 100 and a terminal device control unit 200.

The service server unit 100 may perform functions for generating and managing device control information for controlling a terminal device 20 in a specific area, for a specific period, or in a specific area for a specific period and converting the generated device control information into forms suitable for various distribution routes. The construction of the service server unit 100 is shown in FIG. 2.

Figure 2:
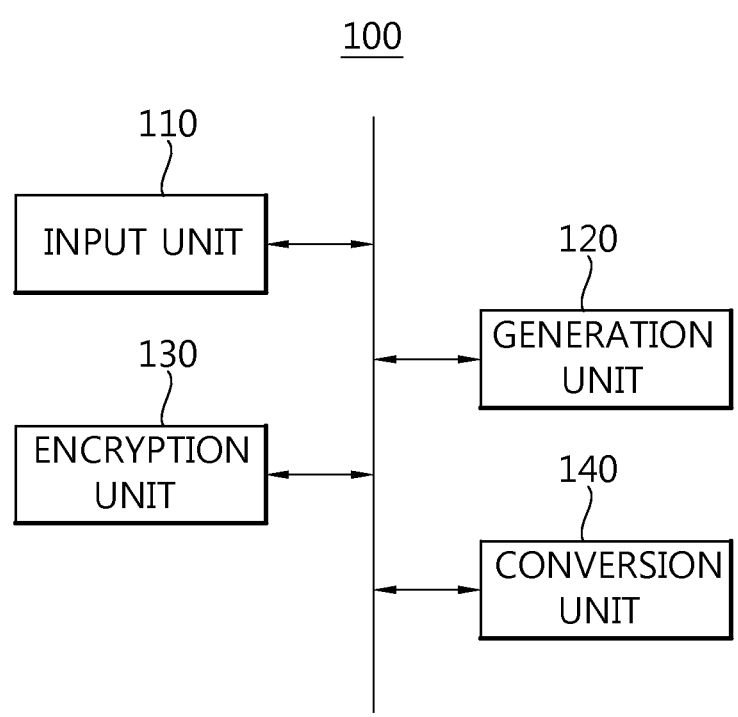
FIG. 2 is a block diagram showing the construction of a service server unit shown in FIG. 1.

FIG. 2 is a block diagram showing the construction of the service server unit 100 shown in FIG. 1.

As shown in FIG. 2, the service server unit 100 may include an input unit 110, a generation unit 120, an encryption unit 130, and a conversion unit 140. The elements 110 to 140 of the service server unit 100 may operate in conjunction with each other. The service server unit 100 can be implemented using one or a plurality of hardware server computers.

The input unit 110 may receive information for controlling the terminal device 20. For example, the input unit 110 may receive information about an area or period or both in which the terminal device 20 will be controlled and pieces of information regarding that what function of the terminal device 20 will be controlled in what way. The input unit 110 may send the pieces of information to the generation unit 120.

The generation unit 120 may generate device control information for controlling the terminal device 20 based on the pieces of information received from the input unit 110. The device control information may include range information and control information.

The range information may include at least one of information about a control area where the terminal device 20 is controlled and information about a control period during which the terminal device 20 is controlled. For example, the range information may include at least one of coordinate information regarding that the terminal device 20 will be controlled in a certain area and period information regarding that the terminal device 20 will be controlled from a certain time to a certain time. That is, the range information includes information for controlling the terminal device 20 in a specific area, for a specific period, or in a specific area for a specific period.

The control information may include information regarding that what function of the terminal device 20 will be controlled in what way. For example, the control information may include information that instructs at least one of various functions, such as a screen capturing function, a photographing function using a camera, a data transfer function, a data storage function, a print function using a printer, an application execution control function, a Universal Subscriber Identity Module (USIM) control function, a USB control function, an external storage control function, a recording prevention function, a call control function, a ring-tone/vibration control function, and a sound control function of the terminal device 20, to be controlled.

The encryption unit 130 may perform a function for encrypting the device control information, generated by the generation unit 120, using a predetermined encryption algorithm. The encryption unit 130 may transfer the encrypted device control information to the conversion unit 140.

The conversion unit 140 may perform a function for converting the device control information received from the encryption unit 130 so that the device control information is suitable for various distribution routes. The distribution routes can be selected in various ways according to implementation environments.

For example, the conversion unit 140 may convert the device control information, received from the encryption unit 130, into a barcode or a Quick Response (QR) code. In this case, the converted barcode or QR code can be distributed over a communication network or through off-line printed matters. The device control information can be obtained by recognizing and interpreting the barcode or the QR code distributed over the terminal device 20 using the barcode recognizer or QR code recognizer of the terminal device 20.

The conversion unit 140 may convert the device control information, received from the encryption unit 130, into data suitable for audio watermarking communication. The audio watermarking communication may mean a communication method of inserting encrypted information into an audio signal that can be heard or cannot be heard by a person, receiving the audio signal through a receiver, and obtaining information by reconstructing the encrypted information. In this case, the converted device control information can be delivered to the terminal device 20 through audio watermarking communication, and the terminal device 20 may obtain the device control information through audio watermarking communication.

Furthermore, the conversion unit 140 may convert the device control information, received from the encryption unit 130, into data suitable for being delivered through data communication. In this case, the converted device control information can be delivered to the terminal device 20 through Near Field Communication (NFC), Universal Serial Bus (USB) communication, LAN communication, wired data communication, or wireless data communication. The terminal device 20 may obtain the device control information through at least one of the transfer methods.

Meanwhile, the device control information can be directly delivered to the terminal device 20 through various distribution routes as described above, but may be delivered to the terminal device 20 through a Uniform Resource Locator (URI) capable of accessing the device control information according to at least one of distribution methods, such as a barcode, a QR code, NFC, USB communication, audio watermarking communication, LAN communication, wired data communication, and wireless data communication. In this case, the terminal device 20 that has received the URI may access the device control information using the URI and obtain the device control information.

Meanwhile, the terminal device control unit 200 can be included in the terminal device 20. The terminal device 20 can be a portable terminal capable of accessing a communication network, such as a smart phone, a smart pad, a tablet PC, or a laptop computer. The terminal device control unit 200 can be a module installed in the terminal device 20 and configured to use the resources of the terminal device 20.

The terminal device control unit 200 may perform functions for managing and changing the state of the terminal device 20 based on the device control information obtained by the terminal device 20 and real-time information about the terminal device 20 and controlling the functions of the terminal device 20 based on the device control information when the state of the terminal device 20 is a terminal device control state.

Figure 3:
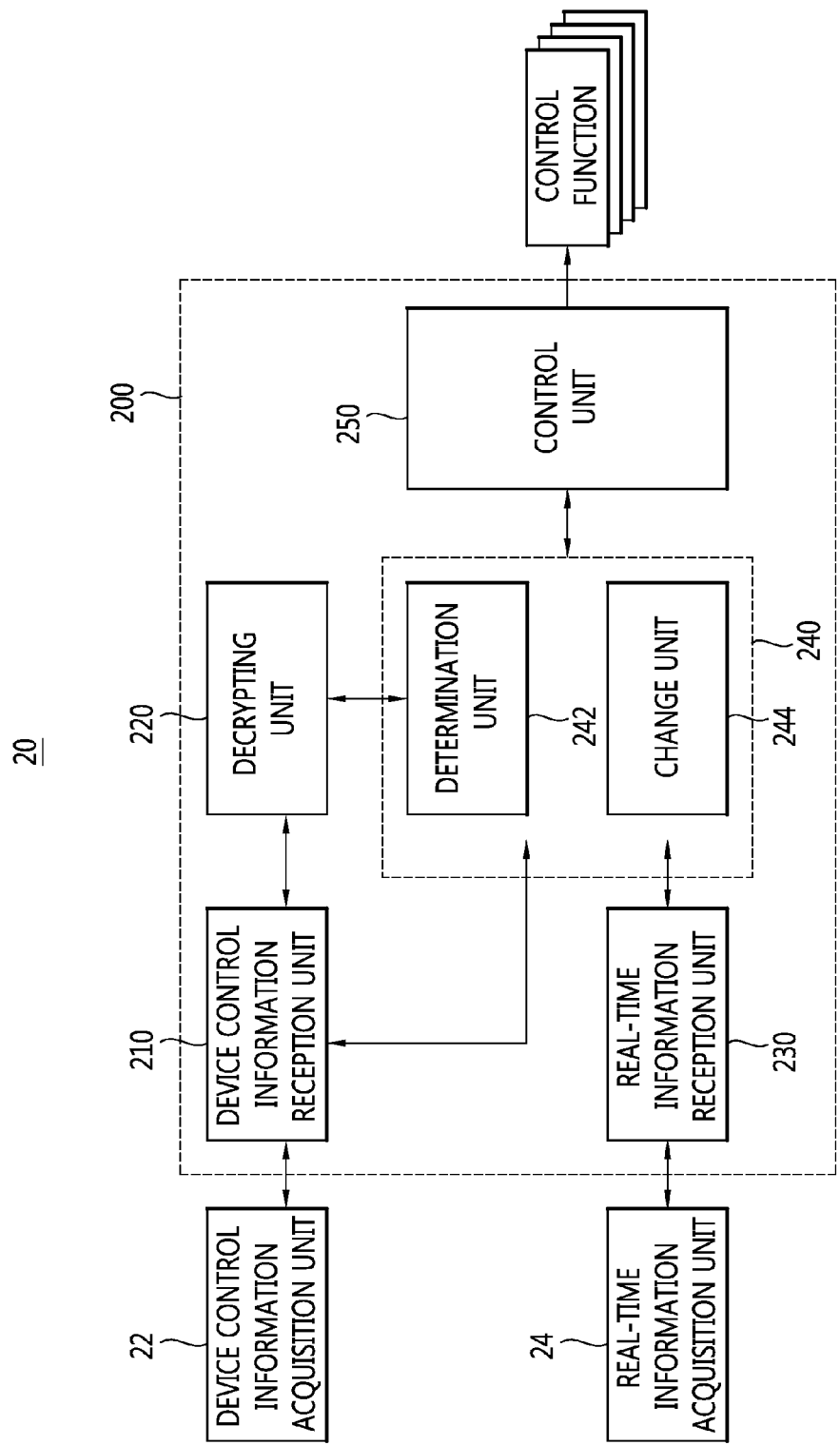
FIG. 3 is a detailed block diagram showing the construction of a terminal device control unit shown in FIG. 1.

FIG. 3 is a detailed block diagram showing the construction of the terminal device control unit 200 shown in FIG. 1.

As shown in FIG. 3, the terminal device control unit 200 may include a plurality of elements capable of operating in conjunction with each other, for example, a device control information reception unit 210, a decrypting unit 220, a real-time information reception unit 230, a state management unit 240, and a control unit 250.

The device control information reception unit 210 may receive device control information for controlling the terminal device 20 from the device control information acquisition unit 22 of the terminal device 20. The device control information may include range information and control information. As described above, the range information may include at least one of information about a control area in which the terminal device 20 is controlled and information about a control period during which the terminal device 20 is controlled. The control information may include information regarding that what function of the terminal device 20 will be controlled in what way.

The device control information acquisition unit 22 of the terminal device 20 is a unit for obtaining the device control information distributed using at least one of various routes or a URI on which the device control information can be accessed. For example, the device control information acquisition unit 22 may directly obtain the device control information and may directly obtain the URI. If the URI is obtained, the device control information acquisition unit 22 may obtain the device control information using the URI.

As described above, the device control information can be distributed through at least one of various distribution forms, for example, a barcode, a QR code, NFC, USB communication, audio watermarking communication, LAN communication, wired data communication, and wireless data communication. Therefore, the device control information acquisition unit 22 may include at least one of, for example, the barcode recognizer, QR code recognizer, NFC module, USB interface, audio watermarking communication module, LAN communication module, wired data communication interface, and wireless data communication interface of the terminal device 20 and may operate in conjunction with one or more of them.

The decrypting unit 220 may decrypt the device control information received by the device control information reception unit 210. Since the device control information is encrypted, converted, and distributed by the service server unit 100, the device control information received by the device control information reception unit 210 may be encrypted information. Accordingly, the decrypting unit 220 may decrypt the encrypted device control information. The device control information decrypted by the decrypting unit 220 is transmitted to the state management unit 240.

The real-time information reception unit 230 may receive real-time information from the real-time information acquisition unit 24 of the terminal device 20. The real-time information may include at least one of the current position and present time of the terminal device 20. The real-time information acquisition unit 24 may include at least one of a positioning module for detecting the current position of the terminal device 20 while operating in conjunction with a Global Positioning System (GPS) or a positioning server and a watch for detecting the present time.

The state management unit 240 may manage the state of the terminal device and may change the state of the terminal device 20 from a terminal device control release state to a terminal device control state or from the terminal device control state to the terminal device control release state based on the device control information received from the decrypting unit 220 and the real-time information received from the real-time information reception unit 230.

Here, the state of the terminal device 20 managed by the state management unit 240 can be divided into the terminal device control state, that is, a first state, and the terminal device control release state, that is, a second state opposite to the first state. The terminal device control state may mean a state in which the control unit 250 controls the functions of the terminal device 20 in response to control information included in the device control information. In contrast, the terminal device control release state may mean a state I which control over the terminal device 20 is released. That is, the terminal device control release state can be a common normal state in which the functions of the terminal device 20 are normally executed while being controlled by the control unit 250. The terminal device 20 becomes the terminal device control state or the terminal device control release state according to a state of the terminal device 20 managed by the state management unit 240.

In accordance with an exemplary embodiment of the present invention, the terminal device 20 becomes the terminal device control state when the terminal device 20 is placed in a control area, the present time of the terminal device 20 is within a control period, or the terminal device 20 is placed in the control area and the present time of the terminal device 20 is within the control period. In other conditions, the terminal device 20 may become the terminal device control release state.

The state management unit 240 may include a determination unit 242 and a change unit 244.

The determination unit 242 may determine whether or not the terminal device 20 is placed in a control range, whether or not the terminal device 20 operates within a control period, or whether or not the terminal device 20 is placed in the control range and operates within the control period based on the range information and the real-time information of the device control information and determine whether or not to change the state of the terminal device 20 based on a result of the determination.

For example, the determination unit 242 may compare a real-time position of the terminal device 20 with a control area included in the device control information and determine whether or not the real-time position of the terminal device 20 is within the control area based on a result of the comparison. Here, if the real-time position of the terminal device 20 is within the control area, the determination unit 242 may determine that the state of the terminal device 20 needs to be changed into the terminal device control state.

For another example, the determination unit 242 may compare the present time of real-time information with a control period included in the device control information and determine whether or not the present time is within the control period based on a result of the comparison. Here, if the present time is within the control period, the determination unit 242 may determine that the state of the terminal device 20 needs to be changed into the terminal device control state.

For yet another example, the determination unit 242 may determine whether or not a real-time position of the terminal device 20 is within a control area and determine whether or not the present time of the terminal device 20 is within a control period. Here, if the real-time position of the terminal device 20 is within the control area and the present time of the terminal device 20 is within the control period, the determination unit 242 may determine that the state of the terminal device 20 needs to be changed into the terminal device control state.

If the determination unit 242 determines that the state of the terminal device 20 needs to changed into the terminal device control state, the change unit 244 may check a current state of the terminal device 20 and change the state of the terminal device 20 into the terminal device control state if, as a result of the check, the current state is the terminal device control release state.

Meanwhile, after the state of the terminal device 20 is changed into the terminal device control state, the determination unit 242 may determine whether or not the terminal device 20 is placed within a control range, whether or not the terminal device 20 operates within a control period, or whether or not the terminal device 20 is placed in the control range and the control period periodically in a preset cycle based on range information included in the device control information and real-time information and may determine whether or not to change the state of the terminal device 20 based on a result of the determination.

For example, after the state of the terminal device 20 is changed into the terminal device control state, the determination unit 242 may compare a real-time position of the terminal device 20 with a control area included in the device control information and determine whether or not the real-time position of the terminal device 20 is within the control area based on a result of the comparison. Here, if the real-time position of the terminal device 20 is not within the control area, the determination unit 242 may determine that the state of the terminal device 20 needs to be changed into the terminal device control release state.

For another example, after the state of the terminal device 20 is changed into the terminal device control state, the determination unit 242 may compare the present time included in the real-time information with a control period included in the device control information and determine whether or not the present time is within the control period based on a result of the comparison. Here, if the present time is not within the control period, the determination unit 242 may determine that the state of the terminal device 20 needs to be changed into the terminal device control release state.

For yet another example, after the state of the terminal device 20 is changed into the terminal device control state, the determination unit 242 may determine whether or not a real-time position of the terminal device 20 is within a control area and determine whether or not the present time of the terminal device 20 is within a control period. Here, if the real-time position of the terminal device 20 is not within the control area or the present time of the terminal device 20 is not within the control period, the determination unit 242 may determine that the state of the terminal device 20 needs to be changed into the terminal device control release state.

If the determination unit 242 determines that the state of the terminal device 20 needs to be changed into the terminal device control release state, the change unit 244 may check a current state of the terminal device 20 and change the state of the terminal device 20 into the terminal device control release state if, as a result of the check, the current state is the terminal device control state.

Whether the state management unit 240 will change the state of the terminal device 20 or not by taking the position of the terminal device 20 into consideration, whether the state management unit 240 will change the state of the terminal device 20 or not by taking the present time of the terminal device 20 into consideration, or whether the state management unit 240 will change the state of the terminal device 20 or not by taking both the position and the present time of the terminal device 20 into consideration can be performed according to implementation environments.

When the state of the terminal device 20 becomes the terminal device control state, the control unit 250 may perform a function for controlling the terminal device 20 based on control information included in device control information. For example, the control unit 250 may control any one of various functions, such as the screen capturing function of the terminal device 20, the photographing function of the terminal device 20 using a camera, the data transfer function of the terminal device 20, the data storage function of the terminal device 20, the print function of the terminal device 20 using a printer, the application execution control function of the terminal device 20, the Universal Subscriber Identity Module (USIM) control function of the terminal device 20, the USB control function of the terminal device 20, the external storage control function of the terminal device 20, the recording prevention function of the terminal device 20, the call control function of the terminal device 20, the ring-tone/vibration control function of the terminal device 20, and the sound control function of the terminal device 20 based on the control information in the terminal device control state.

Figure 4:
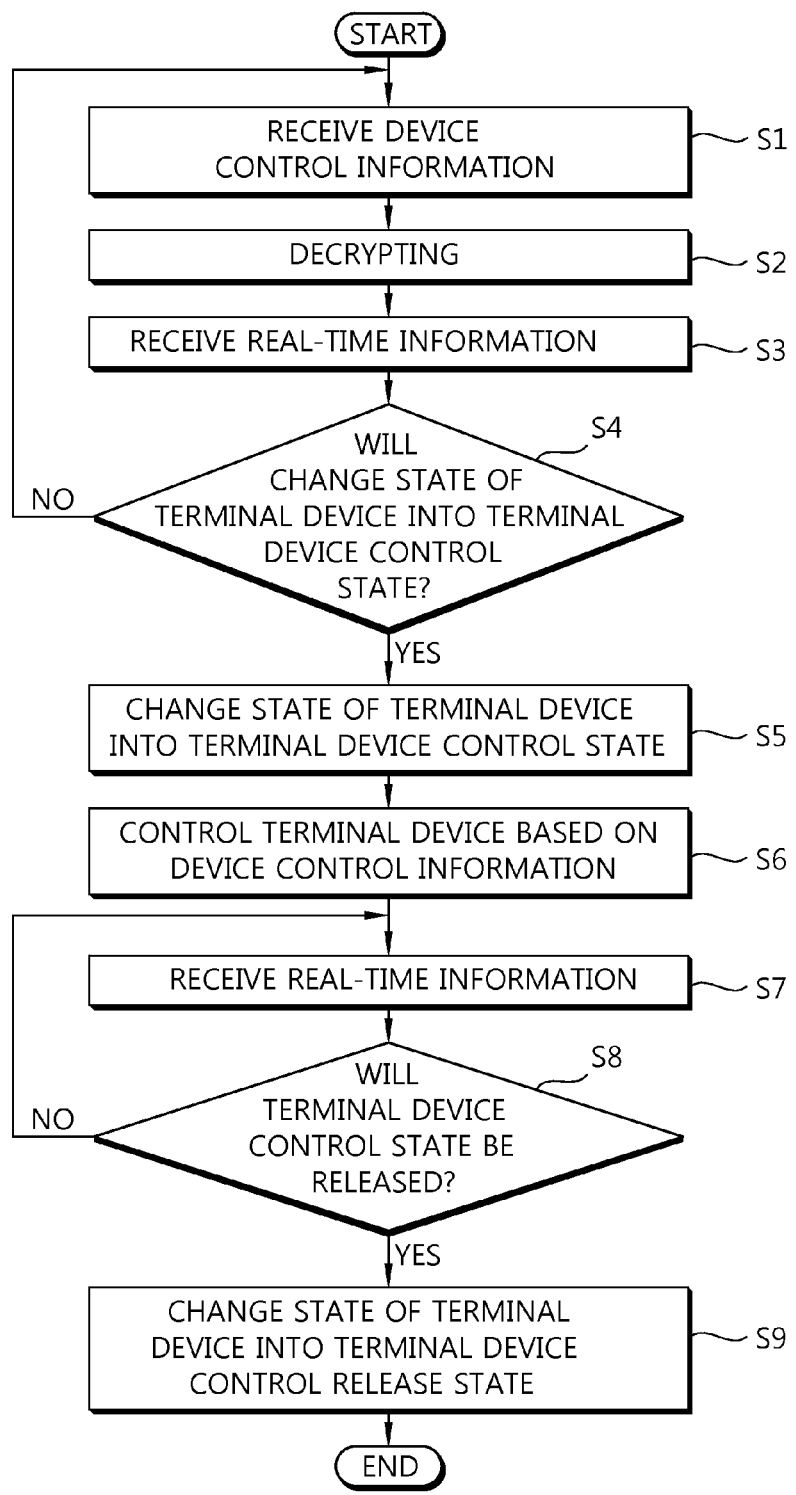
FIG. 4 is a flowchart illustrating a method of controlling a terminal device in accordance with an exemplary embodiment of the present invention.

FIG. 4 is a flowchart illustrating a method of controlling the terminal device in accordance with an exemplary embodiment of the present invention. The method of controlling a terminal device can be executed by the terminal device control unit 200.

First, it is assumed that the state of the terminal device 20 is the terminal device control release state.

As shown in FIG. 4, when a procedure is started, the terminal device control unit 200 may receive device control information for controlling the terminal device 20 from the device control information acquisition unit 22 of the terminal device 20 at step S1. The device control information may include range information and control information. As described above, the range information may include at least one of information about a control area where the terminal device 20 is controlled and information about a control period during which the terminal device 20 is controlled, and the control information may include information regarding that what function of the terminal device 20 will be controlled in what way.

The terminal device control unit 200 may decrypt the received device control information at step S2. Meanwhile, the terminal device control unit 200 may receive real-time information from the real-time information acquisition unit 24 of the terminal device 20 at step S3. The real-time information may include at least one of a current position and the present time of the terminal device 20.

The terminal device control unit 200 which has received the device control information and the real-time information may determine whether or not the terminal device 20 is placed in the control range, whether or not the terminal device 20 operates within the control period, or whether or not the terminal device 20 is placed in the control range and operates within the control period based on the range information included in the device control information and the real-time information and may determine whether or not to change the state of the terminal device 20 into the terminal device control state based on a result of the determination at step S4.

For example, the terminal device control unit 200 may compare a real-time position of the terminal device 20 with a control area included in the device control information and determine whether or not the real-time position of the terminal device 20 is within the control area based on a result of the comparison. Here, if the real-time position of the terminal device 20 is within the control range, the terminal device control unit 200 may determine that the state of the terminal device 20 needs to be changed into the terminal device control state.

For another example, the terminal device control unit 200 may compare the present time, included in the real-time information, with the control period included in the device control information and determine whether or not the present time is within the control period based on a result of the comparison. Here, if the present time is within the control period, the terminal device control unit 200 may determine that the state of the terminal device 20 needs to be changed into the terminal device control state.

For yet another example, the terminal device control unit 200 may determine whether or not a real-time position of the terminal device 20 is within the control range and determine whether or not the present time of the terminal device 20 is within the control period. Here, if the real-time position of the terminal device 20 is within the control range and the present time of the terminal device 20 is within the control period, the terminal device control unit 200 may determine that the state of the terminal device 20 needs to be changed into the terminal device control state.

If, as a result of the determination at step S4, it is determined to change the state of the terminal device 20 into the terminal device control state, the terminal device control unit 200 may change the state of the terminal device 20 into the terminal device control state at step S5. If, as a result of the determination at step S4, it is determined to not change the state of the terminal device 20 into the terminal device control state, the terminal device control unit 200 maintains the current state and may return to a state prior to the step S1 and wait for the reception of device control information or may return to a state prior to the step S3 and wait for the reception of new real-time information (not shown).

When the state of the terminal device 20 is changed into the terminal device control state, the terminal device control unit 200 may control the functions of the terminal device 20 based on the control information included in the device control information in the terminal device control state at step S6. For example, the terminal device control unit 200 may control any one of various functions, such as the screen capturing function of the terminal device 20, the photographing function of the terminal device 20 using a camera, the data transfer function of the terminal device 20, the data storage function of the terminal device 20, the print function of the terminal device 20 using a printer, the application execution control function of the terminal device 20, the Universal Subscriber Identity Module (USIM) control function of the terminal device 20, the USB control function of the terminal device 20, the external storage control function of the terminal device 20, the recording prevention function of the terminal device 20, the call control function of the terminal device 20, the ring-tone/vibration control function of the terminal device 20, and the sound control function of the terminal device 20 based on the control information in the terminal device control state.

Meanwhile, when the state of the terminal device 20 is the terminal device control state, the terminal device control unit 200 may receive real-time information from the real-time information acquisition unit 24 of the terminal device 20 at step S7. The terminal device control unit 200 may determine whether or not the terminal device 20 is placed in the control range, whether or not the terminal device 20 operates within the control period, or whether or not the terminal device 20 is placed in the control range and operates within the control period based on the range information included in the device control information and the received real-time information and may determine whether or not to change the state of the terminal device 20 into the terminal device control release state based on a result of the determination at step S8.

For example, after the state of the terminal device 20 is changed into the terminal device control state, the terminal device control unit 200 may compare a real-time position of the terminal device 20 with a control area included in the device control information and determine whether or not the real-time position of the terminal device 20 is within the control area based on a result of the comparison. Here, if the real-time position of the terminal device 20 is not within the control range, the terminal device control unit 200 may determine that the state of the terminal device 20 needs to be changed into the terminal device control release state.

For another example, after the state of the terminal device 20 is changed into the terminal device control state, the terminal device control unit 200 may compare the present time, included in the real-time information, with the control period included in the device control information and determine whether or not the present time is within the control period based on a result of the comparison. Here, if the present time is not within the control period, the terminal device control unit 200 may determine that the state of the terminal device 20 needs to be changed into the terminal device control release state.

For yet another example, after the state of the terminal device 20 is changed into the terminal device control state, the terminal device control unit 200 may determine whether or not a real-time position of the terminal device 20 is within the control range and determine whether or not the present time of the terminal device 20 is within the control period. Here, if the real-time position of the terminal device 20 is not within the control range or the present time of the terminal device 20 is not within the control period, the terminal device control unit 200 may determine that the state of the terminal device 20 needs to be changed into the terminal device control release state.

If, as a result of the determination at step S8, it is determined to change the state of the terminal device 20 into the terminal device control release state, the terminal device control unit 200 may change the state of the terminal device 20 into the terminal device control release state at step S9. If, as a result of the determination at step S8, it is determined to not change the state of the terminal device 20 into the terminal device control release state, the terminal device control unit 200 maintains the terminal device control state, that is, the current state, and may return to a state prior to the step S7 and wait for the reception of new real-time information.

As described above, in accordance with an exemplary embodiment of the present invention, when the terminal device 20 is placed in a specific area, when the present time of the terminal device 20 is within a predetermined period, or when the terminal device 20 is placed in the specific area and the present time of the terminal device 20 is within the predetermined period, some or all of the functions of the terminal device 20 that need to be controlled can be efficiently controlled.

Accordingly, the illegal leakage of information through the terminal devices 20 can be prevented by controlling the functions of the terminal devices 20 placed in a specific area where unspecific individuals are crowded, such as a museum, a concert hall, or a theater, as well as a company even without operating a certification server.

Figure 5:
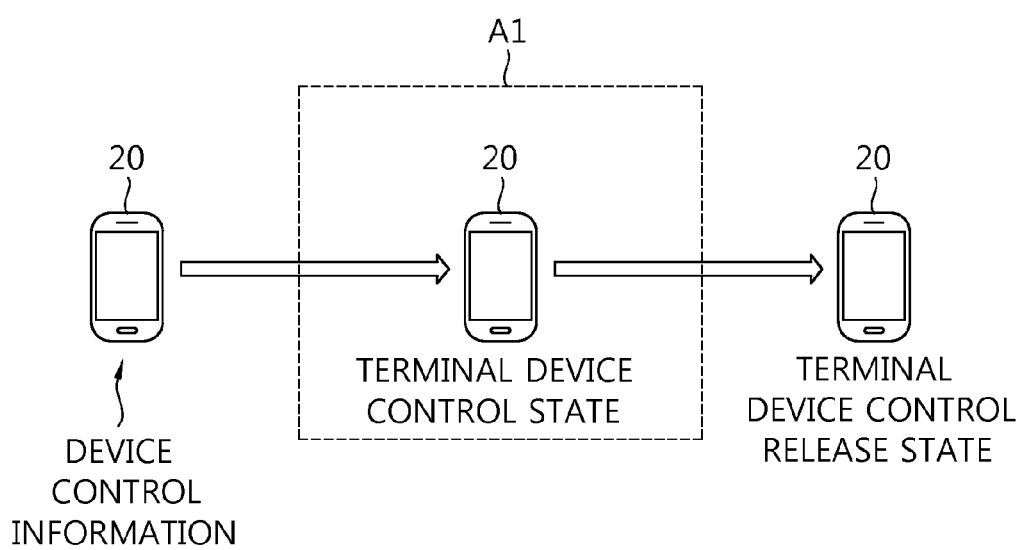
FIG. 5 is an exemplary diagram showing an example in which the functions of a terminal device are controlled in a specific area based on the position of the terminal device.

FIG. 5 is an exemplary diagram showing an example in which the functions of the terminal device 20 are controlled in a specific area based on the position of the terminal device 20.

As shown in FIG. 5, device control information is delivered to the terminal device 20 in various ways. For example, the terminal device 20 may obtain the device control information through at least one of a barcode, a QR code, NFC, USB communication, audio watermarking communication, LAN communication, wired data communication, and wireless data communication.

Next, when the terminal device 20 is placed in a control area defined in the device control information, the state of the terminal device 20 becomes the terminal device control state. The functions of the terminal device 20 in the terminal device control state are controlled in response to control information included in the device control information. When the terminal device 20 deviates from the control area, the state of the terminal device 20 is changed into the terminal device control release state, that is, a common state, so the terminal device 20 may normally use the controlled functions.

Meanwhile, when the terminal device 20 in the terminal device control release state enters the control area again, the state of the terminal device 20 becomes the terminal device control state again, and thus the functions of the terminal device 20 in the terminal device control state are controlled in response to control information included in the device control information. That is, when the terminal device 20 is placed within the control area one or more times, the terminal device 20 may become the terminal device control state. When the terminal device 20 deviates from the control area, the terminal device 20 may become the terminal device control release state.

As described above, in accordance with the present invention, the functions of a terminal device can be efficiently controlled within a specific area or for a specific period or both based on device control information distributed in various ways even without using apparatuses, such as an access point and a certification server, in order to control the terminal device within the specific area or for the specific period or both.

Although the embodiments of the present invention have been described above, a person having ordinary skill in the art will appreciate that the present invention can be modified, changed, and implemented in various ways without departing from the technical spirit and scope of the present invention. Accordingly, the present invention is not limited to the embodiments, and the present invention can be said to include all embodiments within the scope of the claims below.

What is claimed is:

1. A method of controlling a terminal device, comprising:
receiving, by a terminal device control unit included in the terminal device, device control information comprising range information, comprising at least one of a control area and a control period in which the terminal device is controlled, and control information for controlling the terminal device from a first information acquisition unit of the terminal device, the control information authorizing the control unit to control one or more functions of the terminal device when in the terminal device control state, wherein the first information acquisition unit obtains the device control information and a Uniform Resource Locator (URI) on which the device control information is obtained through at least one of a barcode, a Quick Response (QR) code, Universal Serial Bus (USB) communication, and audio watermarking communication;
receiving, by the terminal device control unit, real-time information comprising at least one of a real-time position and present time of the terminal device from a second information acquisition unit of the terminal device;
determining, by the terminal device control unit, whether or not to change a state of the terminal device into a terminal device control state based on the range information and the real-time information;
changing, by the terminal device control unit, the state of the terminal device into the terminal device control state based on a result of the determination; and
controlling, by the terminal device control unit, the terminal device based on the control information in the terminal device control state.

2. The method of claim 1, wherein determining, by the terminal device control unit, whether or not to change a state of the terminal device into a terminal device control state comprises:
determining whether or not the real-time position of the terminal device is within the control area; and
determining to change the state of the terminal device into the terminal device control state if, as a result of the determination, the real-time position of the terminal device is within the control area.

3. The method of claim 1, wherein determining, by the terminal device control unit, whether or not to change a state of the terminal device into a terminal device control state comprises:
determining whether or not the present time is within the control period; and
determining to change the state of the terminal device into the terminal device control state if, as a result of the determination, the present time is within the control period.

4. The method of claim 1, wherein determining, by the terminal device control unit, whether or not to change a state of the terminal device into a terminal device control state comprises:
determining whether or not the real-time position is within the control area;
determining whether or not the present time is within the control period; and
determining to change the state of the terminal device into the terminal device control state if, as a result of the determination, the real-time position is within the control area and the present time is within the control period.

5. The method of claim 1, wherein:
the first information acquisition unit obtains the device control information using the URI if the URI is obtained.

6. The method of claim 1, further comprising:
receiving, by the terminal device control unit, real-time information comprising at least one of a real-time position and a present time of the terminal device from the second information acquisition unit after changing the state of the terminal device into the terminal device control state;
determining, by the terminal device control unit, at least one of whether or not the real-time position of the terminal device has deviated from the control area and whether or not the present time of the terminal device has deviated from the control period; and
changing, by the terminal device control unit, the state of the terminal device from the terminal device control state to a terminal device control release state based on at least one of the determinations.

7. The method of claim 1, wherein controlling, by the terminal device control unit, the terminal device based on the control information in the terminal device control state comprises controlling at least one of a screen capturing function, a photographing function using a camera, a data transfer function, a data storage function, a print function using a printer, an application execution control function, a Universal Subscriber Identity Module (USIM) control function, a USB control function, an external storage control function, a recording prevention function, a call control function, a ring-tone/vibration control function, and a sound control function of the terminal device based on the control information.

8. The method of claim 1, wherein:
the received device control information is encrypted, and the method further comprises decrypting the encrypted device control information.

9. The method of claim 1 wherein the device control information is obtained through audio watermarking communication.

10. The method of claim 1 wherein authorizing the control unit to control one or more functions of the terminal device includes allowing the control unit to enable and disable the one or more functions of the terminal device.

11. The method of claim 1 wherein the control information identifies the one or more functions of the terminal device that the control unit is authorized to control.

12. A terminal device comprising a terminal device controller comprising:
a device control information reception unit for receiving device control information comprising range information, comprising at least one of a control area and a control period in which the terminal device is controlled, and control information for controlling the terminal device from a first information acquisition unit of the terminal device, the control information authorizing a control unit to control one or more functions of the terminal device when in the terminal device control state, wherein the first information acquisition unit is configured to obtain the device control information and a Uniform Resource Locator (URI) on which the device control information is obtained through at least one of a barcode, a Quick Response (QR) code, Universal Serial Bus (USB) communication, or audio watermarking communication;

a real-time information reception unit for receiving real-time information comprising at least one of a real-time position and a present time of the terminal device from a second information acquisition unit of the terminal device;

a state management unit for determining whether or not to change a state of the terminal device into a terminal device control state based on the range information and the real-time information and changing the state of the terminal device into the terminal device control state based on a result of the determination; and the control unit for controlling the terminal device based on the control information in the terminal device control state.

13. The terminal device of claim 12, wherein the state management unit determines whether or not the real-time position of the terminal device is within the control area and determines to change the state of the terminal device into the terminal device control state if, as a result of the determination, the real-time position of the terminal device is within the control area.

14. The terminal device of claim 12, wherein the state management unit determines whether or not the present time is within the control period and determines to change the state of the terminal device into the terminal device control state if, as a result of the determination, the present time is within the control period.

15. The terminal device of claim 12, wherein the state management unit determines whether or not the real-time position is within the control area, determines whether or not the present time is within the control period, and determines to change the state of the terminal device into the terminal device control state if, as a result of the determination, the real-time position is within the control area and the present time is within the control period.

16. The terminal device of claim 12, wherein the first information acquisition unit obtains the device control information using the URI if the URI is obtained.

17. The terminal device of claim 12, wherein:

the real-time information reception unit receives real-time information comprising at least one of a real-time position and a present time of the terminal device from the second information acquisition unit after changing the state of the terminal device into the terminal device control state, and the state management unit determines at least one of whether or not the real-time position of the terminal device has deviated from the control area and whether or not the present time of the terminal device has deviated from the control period and changes the state of the terminal device from the terminal device control state to a terminal device control release state based on at least one of the determinations.

18. The terminal device of claim 12, wherein the control unit controls at least one of a screen capturing function, a photographing function using a camera, a data transfer function, a data storage function, a print function using a printer, an application execution control function, a Universal Subscriber Identity Module (USIM) control function, a USB control function, an external storage control function, a recording prevention function, a call control function, a ring-tone/vibration control function, and a sound control function of the terminal device based on the control information.

19. The terminal device of claim 12 wherein the device control information is obtained through audio watermarking communication.

20. The terminal device of claim 12 wherein authorizing the control unit to control one or more functions of the terminal device includes allowing the control unit to enable and disable the one or more functions of the terminal device.

21. The terminal device of claim 12 wherein the control information identifies the one or more functions of the terminal device that the control unit is authorized to control.

22. A terminal device control system, comprising:

a server device comprising a server unit configured to generate device control information comprising range information, comprising at least one of a control area and a control period in which a terminal device is controlled, and control information for controlling the terminal device, the control information authorizing a control unit to control one or more functions of the terminal device when in the terminal device control state, and converting the generated device control information into a distributable form; and a terminal device comprising the terminal device control unit configured to change a state of the terminal device into a terminal device control state based on the device control information obtained by the terminal device and real-time information comprising at least one of a real-time position and a present time of the terminal device and to control at least one function of the terminal device based on the control information in the terminal device control state;

wherein the terminal device is configured to obtain the device control information and a Uniform Resource Locator (URI) on which the device control information is obtained through at least one of a barcode, a Quick Response (QR) code, Universal Serial Bus (USB) communication, and audio watermarking communication.

23. The terminal device control system of claim 22, wherein the terminal device obtains the device control information using the URI if the URI is obtained.

24. The terminal device control system of claim 22, wherein the terminal device control unit determines at least one of whether or not the real-time position of the terminal device has deviated from the control area and whether or not the present time of the terminal device has deviated from the control period based on the real-time position of the terminal device obtained from the terminal device, after changing the state of the terminal device into the terminal device control state, and changes the state of the terminal device from the terminal device control state to a terminal device control release state based on at least one of the determinations.

25. The terminal device control system of claim 22, wherein the terminal device controller controls at least one of a screen capturing function, a photographing function using a camera, a data transfer function, a data storage function, a print function using a printer, an application execution control function, a Universal Subscriber Identity Module (USIM) control function, a USB control function, an external storage control function, a recording prevention function, a call control function, a ring-one/vibration control function, and a sound control function of the terminal device based on the control information in the terminal device control state.

26. The terminal device control system of claim 22, wherein the server unit converts the generated device control information into one of a barcode, a QR code, audio watermarking communication, and data enabling at least one of NFC, USB communication, LAN communication, wired data communication, and wireless data communication.

27. The terminal device control system of claim 22 wherein the device control information is obtained through audio watermarking communication.

28. The terminal device control system of claim 22 wherein authorizing the control unit to control one or more functions of the terminal device includes allowing the control unit to enable and disable the one or more functions of the terminal device.

29. The terminal device control system of claim 22 wherein the control information identifies the one or more functions of the terminal device that the control unit is authorized to control.

* * * * *